G. W. & J. FIELDES.
MONKEY WRENCH.
APPLICATION FILED FEB. 16, 1911.
994,070.
Patented May 30, 1911.
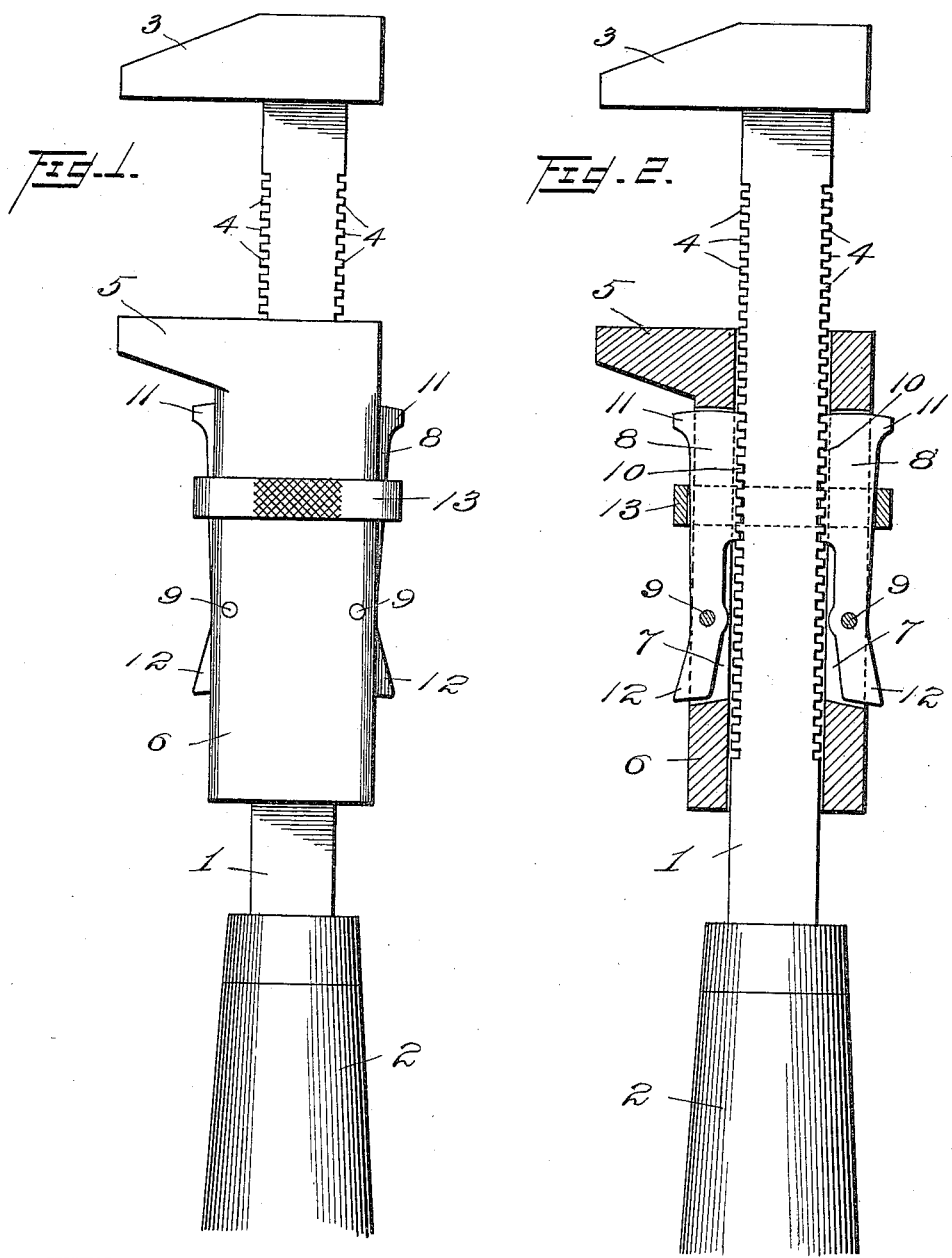
WITNESSES
INVENTORS
George W. Fieldes
Joseph Fieldes
By
Attorney

UNITED STATES PATENT OFFICE.

GEORGE W. FIELDES AND JOSEPH FIELDES, OF CLENDENIN, WEST VIRGINIA.

MONKEY-WRENCH.

994,070.　　　　　　Specification of Letters Patent.　　Patented May 30, 1911.

Application filed February 16, 1911. Serial No. 609,046.

*To all whom it may concern:*

Be it known that we, GEORGE W. FIELDES and JOSEPH FIELDES, citizens of the United States, residing at Clendenin, in the county of Kanawha and State of West Virginia, have invented certain new and useful Improvements in Monkey-Wrenches, of which the following is a specification.

This invention relates to monkey wrenches and one of the principal objects of the same is to provide means for quickly adjusting the movable member to clamp the nut in position to be turned on or off a bolt.

Another object of the invention is to provide a monkey wrench having a rigid jaw member secured to one end of the shank, said shank having rack teeth upon opposite edges thereof and a movable jaw member provided with pivoted pawls and a ring for holding the pawls in engagement with the rack teeth, said pawls having extended ends to be engaged by the ring for holding said pawls out of engagement with the rack teeth.

Still another object of the invention is to provide a metal shank having rack teeth upon its opposite edges and a rigid jaw member formed on said shank, and a sliding jaw member adjustable on said shank and held in adjusted position by means of pivoted pawls, said pawls being held in engagement with said rack teeth on the shank by means of a sliding ring and said pawls having projected ends to be engaged by said ring for throwing the pawls out of engagement with the rack teeth of the shank, said pawls being pivotally connected to the sliding member and extending through openings therein to engage the teeth of the shank.

These and other objects may be attained by means of the construction illustrated in the accompanying drawing in which—

Figure 1 is a side elevation of a monkey wrench made in accordance with our invention, a portion of the handle being broken away; Fig. 2 is a view in elevation of the shank and the pawls for engaging said shank, the movable jaw and the clamping ring being shown in section and a portion of the handle being broken away.

Referring to the drawing, the numeral 1 designates a flat metal shank of substantially rectangular cross section secured to a suitable handle 2, said shank having a rigid jaw member 3 secured to or formed integral with its outer end. The shank 1 is provided with a series of ratchet teeth 4 upon opposite edges thereof. The sliding jaw member 5 is formed integral with a sleeve 6 adapted to slide on the shank 1, said sleeve having oppositely disposed slots 7 formed in line with the ratchet teeth 4. Pawls 8 are pivotally mounted in the slots 7 by means of pins 9 extending through the pawls and through the walls of the slots 7, said pins being headed into the sleeve 6. The pawls 8 are each provided with a series of teeth 10 which engage the rack teeth 4 of the shank at their outer ends and upon their inner sides. Formed on the pawls 8 at their outer ends are projecting stop lugs 11 and at the opposite or inner ends of said pawls cam projections 12 are provided, said projections extending beyond the sleeve 6, as shown more clearly in Fig. 2.

A sliding clamp ring 13 encircles the sleeve 6 and engages the pawls 8 for holding said pawls in engagement with the rack teeth 4, said ring being slidable to engage the cam projections 12 on said pawls for holding the teeth on said pawls out of engagement with the teeth 4 of the shank and to permit a quick sliding adjustment of the member 5 to clamp the nut between the members 3 and 5.

It is to be noted that the outer edges of the pawls 8 project slightly beyond the surface of the sleeve 6 so that the ring 13 will hold said pawls firmly in engagement with the teeth of the shank 4 when pushed in one direction and will throw the pawls out of engagement with the teeth when moved in the opposite direction to engage the projections 12. It is to be noted that the pivotal pins 9 for the pawls are located near the ends of said pawls in order that the teeth on said pawls may be thrown out of engagement with the teeth 4 of the shank.

From the foregoing it will be obvious that a monkey wrench made in accordance with our invention can be quickly adjusted to clamp a nut and that when adjusted the pawls can be quickly and firmly held in engagement with the teeth of the shank for clamping a nut and that when it is desired to release the nut the clamping ring can be quickly slid back to engage the projections 12 and the jaw member 5 thrown out of engagement with the nut.

Our invention is simple in construction, quick in operation, reliable in use and can be made at low cost.

We claim:—

The herein described wrench comprising a shank having a rigid member on its outer end, said shank having rack teeth on its opposite edges, a sliding member comprising a sleeve having a jaw member rigidly formed thereon, said sleeve being provided with slots in its opposite sides, pawls pivoted in said slot, said pawls having teeth to engage the teeth of the shank, said pawls having outwardly extending cam ends, and a sliding ring encircling the sleeve and pawls for holding the teeth in engagement with the teeth of the shank, said ring being adapted to engage said cam projections for throwing the pawls out of engagement with the teeth of the shank.

In testimony whereof we affix our signatures in presence of two witnesses.

GEORGE W. FIELDES.
JOSEPH FIELDES.

Witnesses:
 PORUS J. YOUNG,
 N. T. FIELDS.

Copies of this patent may be obtained for five cents each, by addressing the "Commissioner of Patents, Washington, D. C."